United States Patent
Fields et al.

(10) Patent No.: US 6,450,795 B1
(45) Date of Patent: Sep. 17, 2002

(54) QUICK CHANGE MOUNTING APPARATUS AT THE EJECT STATION OF AN INJECTION STRETCH BLOW MOLDING MACHINE

(75) Inventors: Randal L. Fields, Greenwood, MO (US); Vladimir Feldman, Overland Park, KS (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 37 days.

(21) Appl. No.: 09/687,311

(22) Filed: Oct. 12, 2000

(51) Int. Cl.[7] .......................... B29C 49/36; B29C 49/70
(52) U.S. Cl. .................... 425/182; 425/441; 425/529; 425/537; 425/540
(58) Field of Search ................... 425/182, 537, 425/540, 441, 525, 529

(56) References Cited

U.S. PATENT DOCUMENTS

| 4,441,878 A | * | 4/1984 | Harry | 425/537 |
| 4,747,769 A | * | 5/1988 | Nakamura et al. | 425/529 |
| 5,308,237 A | * | 5/1994 | Kieran | 425/537 |
| 5,744,176 A | * | 4/1998 | Takada et al. | 425/529 |

FOREIGN PATENT DOCUMENTS

| EP | 0411592 A2 | * | 2/1991 | 425/537 |
| JP | 06254950 A | * | 9/1994 | B29C/49/70 |

* cited by examiner

Primary Examiner—Robert Davis
(74) Attorney, Agent, or Firm—Hovey Williams LLP

(57) ABSTRACT

The vertically reciprocable eject head at the finished article eject station of a molding machine has a row of cylindrical eject cores that project downwardly from the head during operation. From time-to-time, the eject cores must be replaced with a different set of cores having a different spacing and number. A universal mounting plate forming part of the quick change apparatus of the eject head has an elongated through slot extending longitudinally along the length of the universal plate that receives the eject cores but does not establish their position. One or more adaptor plates detachably fastened to the bottom side of the universal plate has a row of holes therein that register with the receiving slot of the mounting plate so as to establish the number and location of eject cores that can be carried by the eject head.

15 Claims, 10 Drawing Sheets

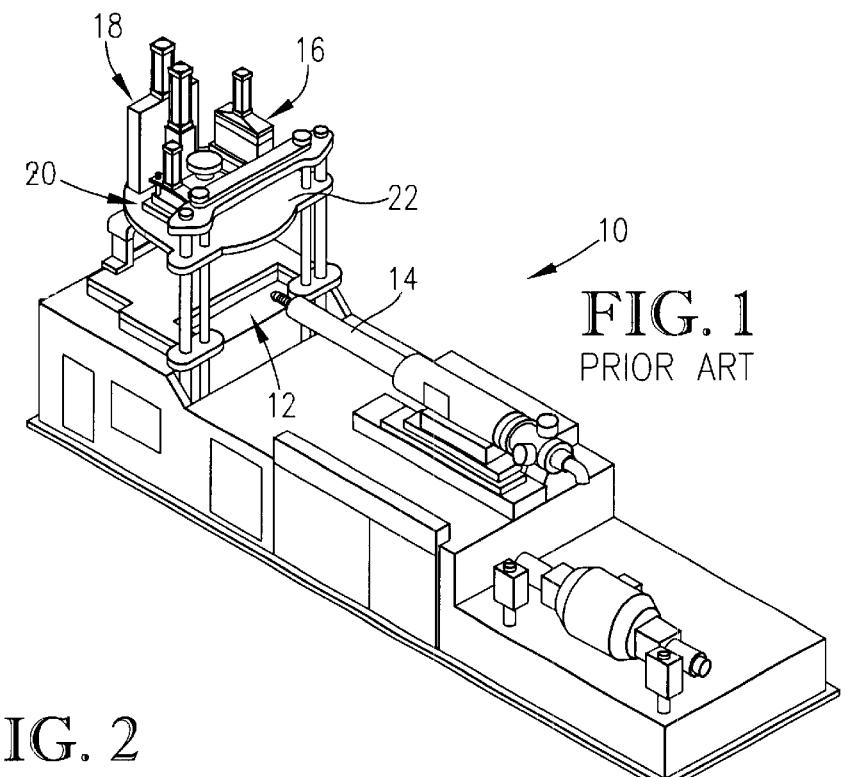
FIG. 1
PRIOR ART
FIG. 2
PRIOR ART
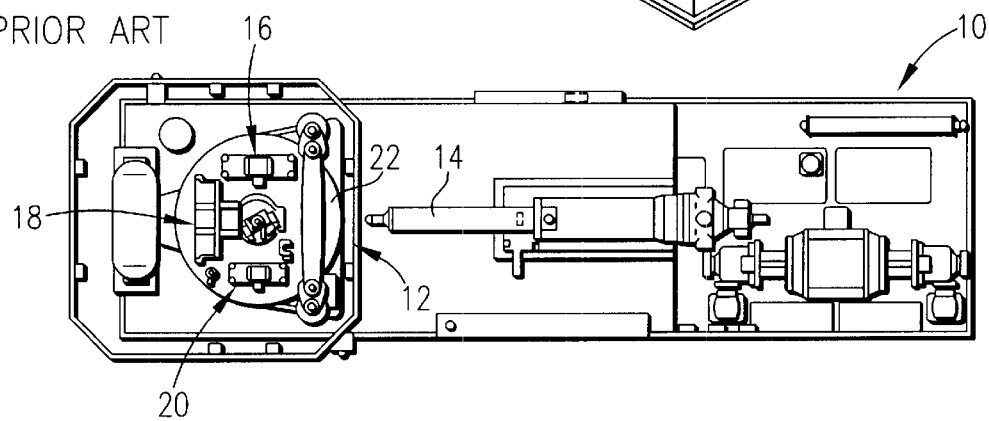
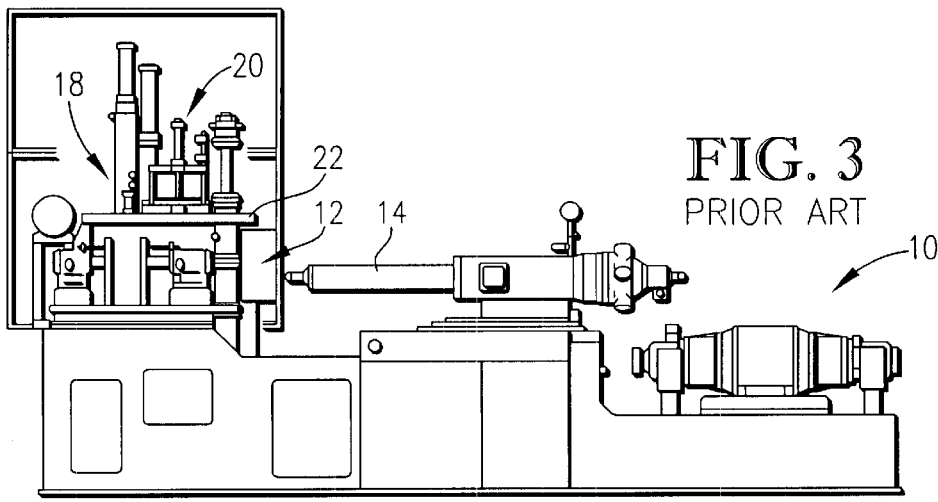
FIG. 3
PRIOR ART

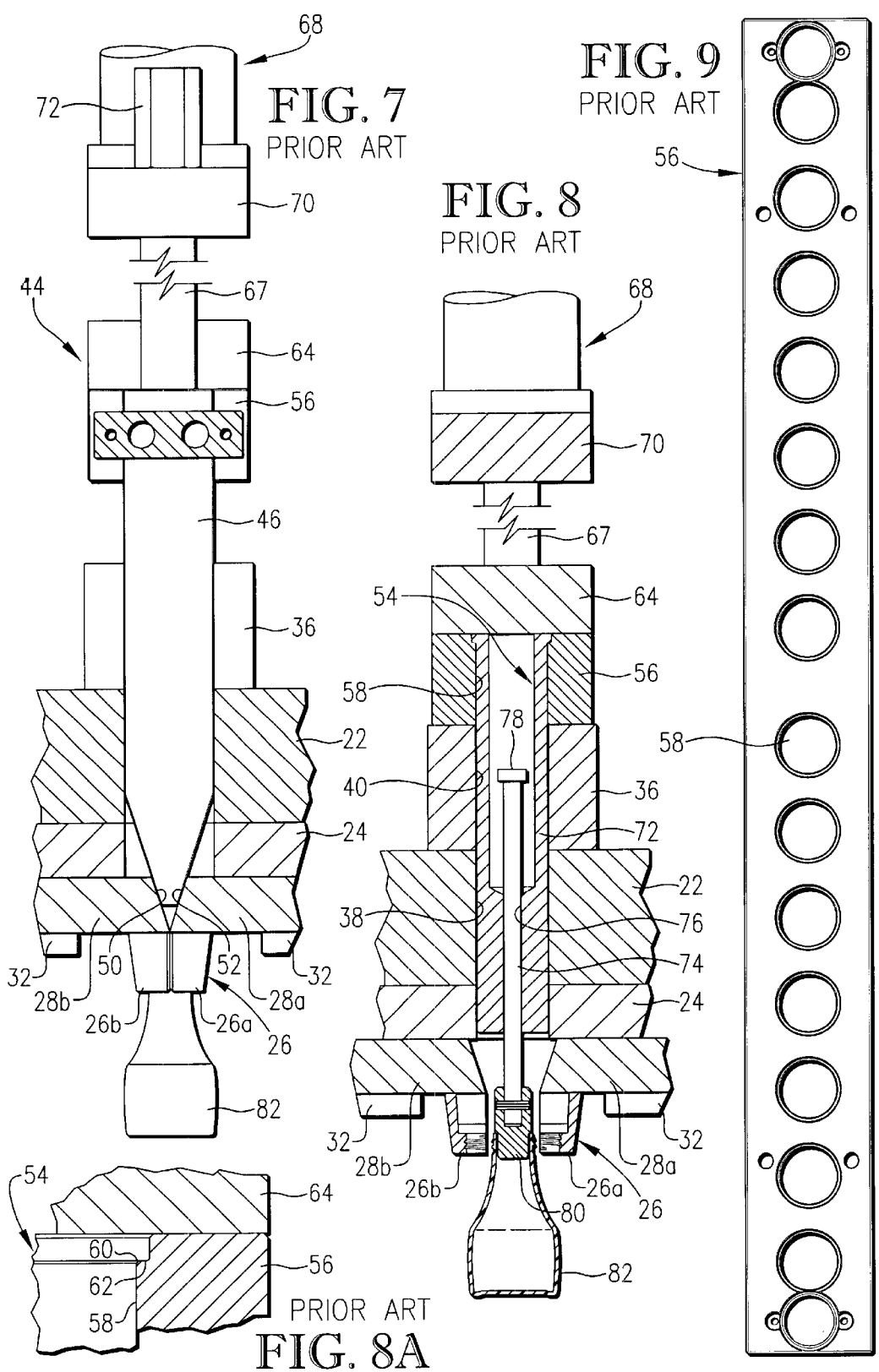

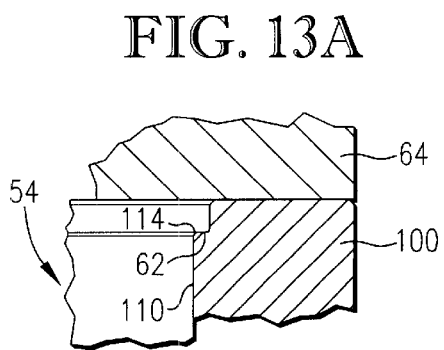
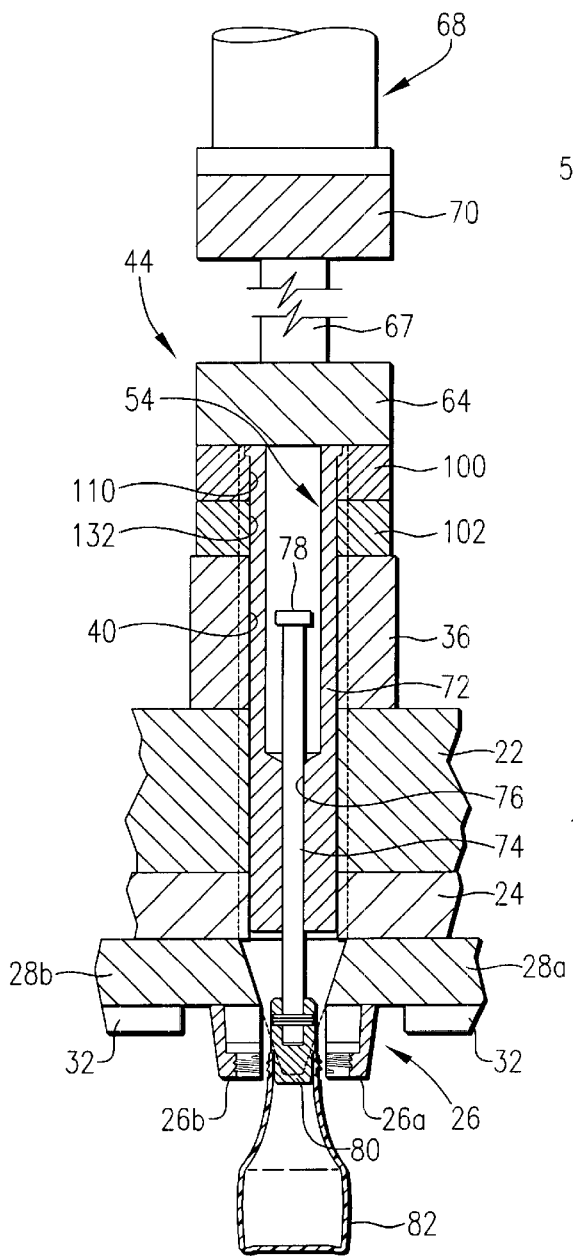
FIG. 13
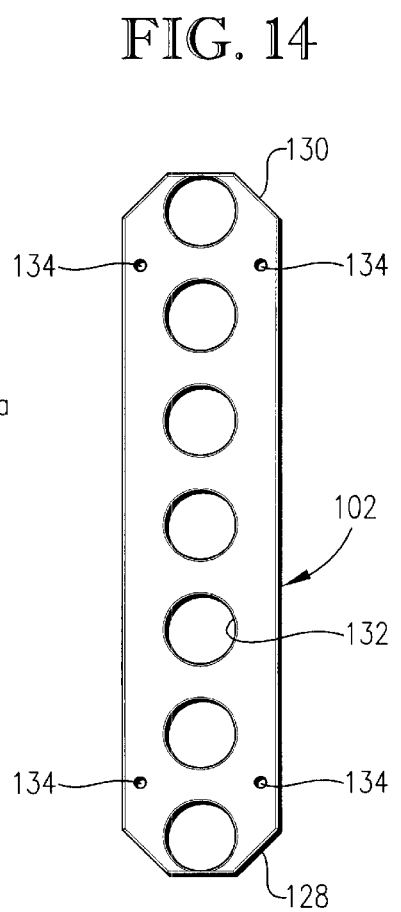
FIG. 14

US 6,450,795 B1

QUICK CHANGE MOUNTING APPARATUS AT THE EJECT STATION OF AN INJECTION STRETCH BLOW MOLDING MACHINE

TECHNICAL FIELD

This invention relates to thermoplastic injection molding machines and, more particularly, to injection stretch blow molding machines wherein a finished article is released from the machine at an eject station to a container or conveyor for further processing. In particular, the present invention relates to improvements which make various components of the eject station quickly interchangeable to adapt the station for handling production runs of different blow-molded articles.

BACKGROUND

Injection stretch blow machines make hollow preforms and then convert such preforms into finished articles before the preforms leave the machine. Typically, a turret-like rotation plate on the machine indexes a set of thread splits through multiple stations including at least an injection station, a stretch blow station, and an eject station. Some machines also include a conditioning station between the injection station and the stretch blow station.

At the injection station hot molten thermoplastic material is injected into a set of preform molds with which the thread splits are associated so that after the injection cycle is completed, the preforms remain gripped by the thread splits on the rotation plate for indexing to the next station. At the stretch blow station, the preforms remain gripped by the thread splits but are then subjected to mechanical and pneumatic stretching through an internal stretch rod and internally introduced air pressure to expand and fill a hollow mold at that station. Finally, the rotation plate indexes the thread splits and their articles to the eject station where the thread splits are separated to release the articles.

The eject station includes a pneumatically operated, vertically reciprocable eject head that, by cam operation, separates the thread splits during an ejection stroke and physically contacts the finished articles with devices known as eject cores to encourage the articles to drop from, rather than adhere to, the thread splits when the splits separate. Due to the fact that the same machine is used to run many different products, the eject cores and the structure that mounts and guides them must be frequently removed and replaced with different components that are compatible with the specific product being run at the time. Different products may require a different number of mold cavities or have different neck finishes that necessitate this change over.

However, many of the components at the eject station are massive and unwieldy. Thus, in conventional machines, changing over the eject station from one production run to another is a very laborious, time-consuming, and unpleasant procedure. Typically, a worker must actually climb up on the machine, disassemble the eject station, and lift heavy components to one side in order to have access to parts that need to be changed out. Then he must lift and reassemble the apparatus back into position when the new parts have been installed. Obviously, the machine must be idle during this change-over, and the protracted delay can seriously reduce the productivity of the production facility.

SUMMARY OF THE INVENTION

The present invention provides a safe, quick and easy way of changing out the necessary components at the eject station each time a new product run requires such change. Rather than requiring complete disassembly of the eject station, including its heavy, cast-iron crosshead and pneumatic actuator, the present invention contemplates merely removing a few threaded fasteners, detaching a few relatively light-weight components from one another, and replacing one or more adaptor plates of the apparatus with a different set of adapter plates that correspond to the specific number and location of mold cavities for the new production run. Instead of replacing the entire eject core mounting plate of the station with a new mounting plate having a different number of eject cores, the present invention contemplates always using the same universal mounting plate for all mold cavities and then simply interchanging quickly and easily detachable adaptor plates that effectively modify the mounting plate to receive an appropriate number of corresponding new eject cores.

BRIEF DESCRIPTION OF THE DRAWINGS

FIG. 1 is a perspective view of a prior art injection stretch blow molding machine;

FIG. 2 is a top plan view of the prior art machine;

FIG. 3 is a side elevational view of the prior art machine;

FIG. 7 is an enlarged, fragmentary end elevational view of the prior art eject station with the eject head in the partially lowered position of FIG. 6;

FIG. 8 is an enlarged, fragmentary cross-sectional view of the prior art eject station taken substantially along line 8—8 of FIG. 6 but showing the eject head in its fully lowered position with the thread splits open and separated to release the article;

FIG. 8a is a further enlarged detail view of the prior art eject station illustrating the manner in which the eject cores are seated within the mounting plate of the eject head;

FIG. 9 is a top plan view of the prior art eject core mounting plate of the eject station;

FIG. 13 is an enlarged, fragmentary cross-sectional view through the eject station of FIG. 12 taken substantially along line 13—13 of FIG. 12;

FIG. 13a is a further enlarged, fragmentary detail view of the eject head illustrating the manner in which the eject cores seat within a recess in the universal mounting plate of the eject head;

FIG. 14 is a top plan view of an adapter plate forming a part of the quick change apparatus;

DETAILED DESCRIPTION

The Prior Art Apparatus

Figure 4:
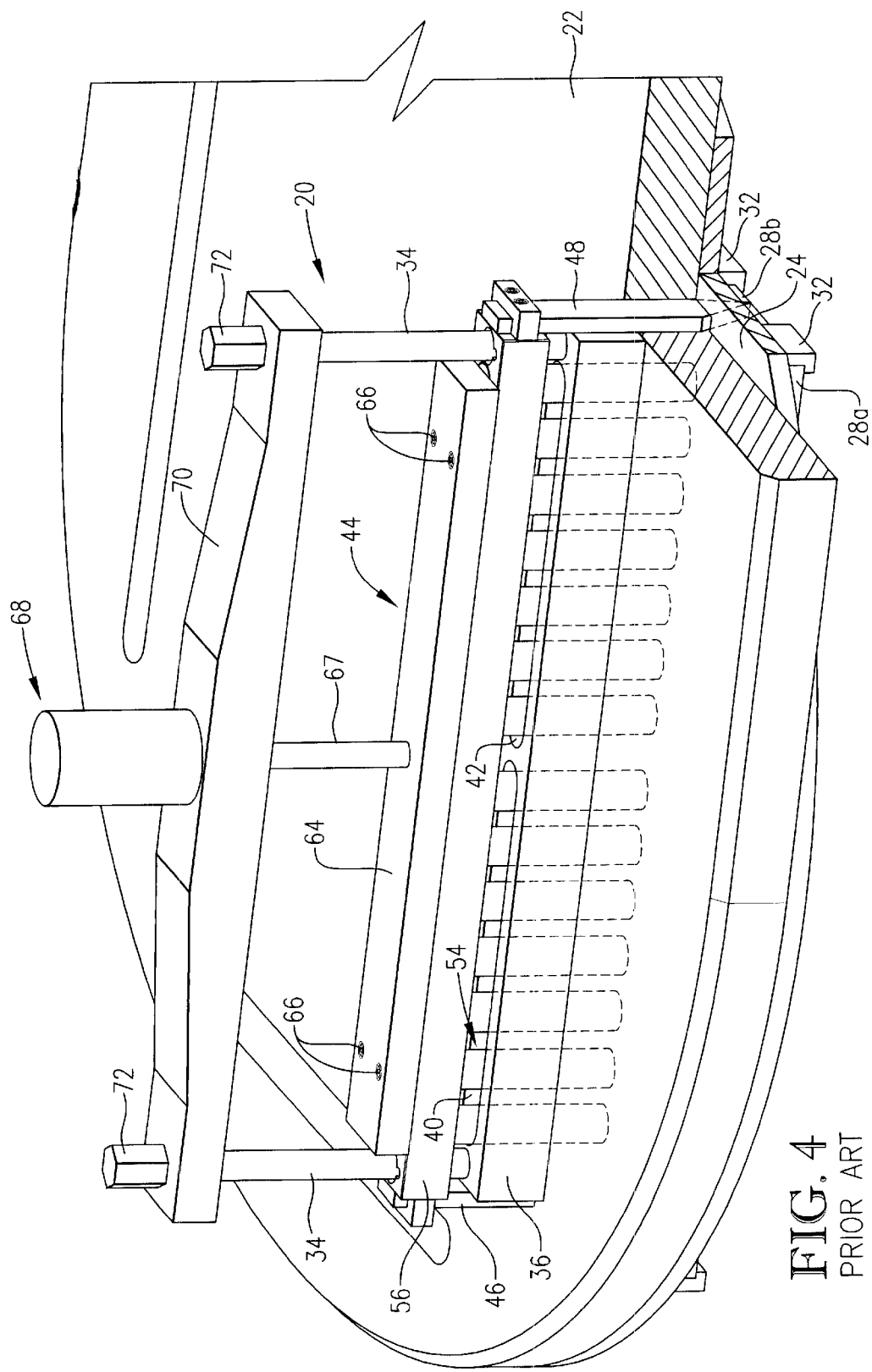
FIG. 4 is an enlarged, fragmentary perspective view of the eject station of the prior art machine showing the reciprocable eject head of the station approaching the bottom of an ejection stroke.

The present invention is not limited to any particular brand or type of injection molding machine. Therefore, in the description that follows, and in the drawings that accompany the description, references to particular machines should be understood as being exemplary only in order to disclose a preferred embodiment of the invention, rather than as being presented to limit the scope of the invention.

The particular prior art injection stretch blow molding machine 10 selected for purposes of illustration in FIGS. 1–3 is a Nissei Model 650 machine having four stations. A first, injection station generally denoted by the numeral 12, is where hot, molten thermoplastic material is injected into a set of mold cavities (not shown) from a nozzle 14. A second, conditioning station is generally denoted by the numeral 16 and is the location where preforms molded at the injection station can be subjected to certain additional shaping and temperature conditioning, if desired. A third, stretch blow station is generally denoted by the numeral 18 and is the location where the preforms are stretched and blown into their final configuration within blow molds. A fourth, eject station broadly denoted by the numeral 20 is the location at which the finished articles are then released from the machine to gravitate into an awaiting container or conveyor belt for further processing. A large, stationary cast iron plate 22 of the machine overlies a turret-like rotation plate (not shown in FIGS. 1-3) that will be described in more detail below and which is used to transport the preforms and finished articles from one station to the next.

Figure 5:
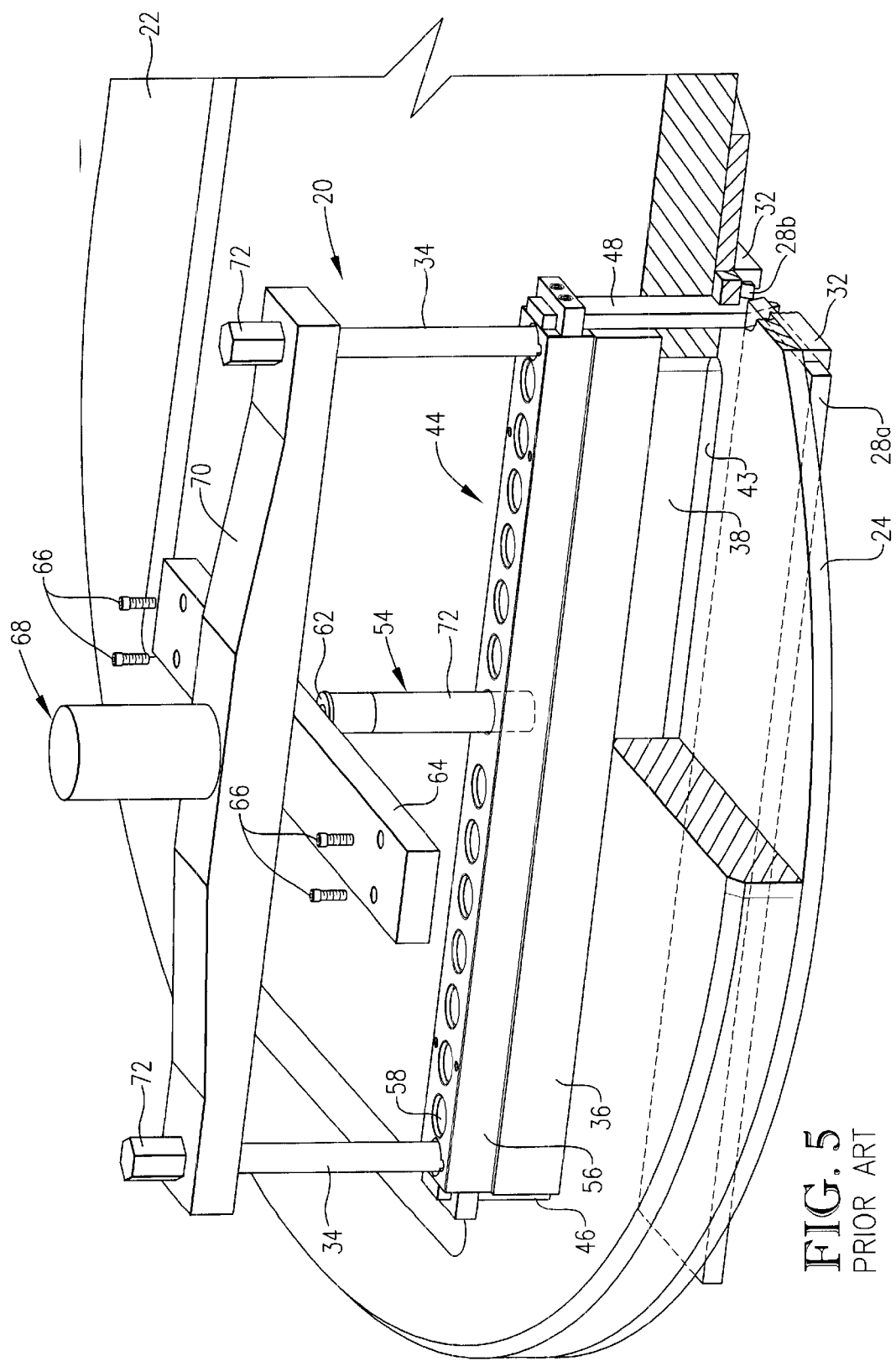
FIG. 5 is a fragmentary perspective view of the eject station of the prior art machine with parts broken away for clarity, the station being partially disassembled to illustrate the fact that not all eject cores can be easily removed.
Figure 6:
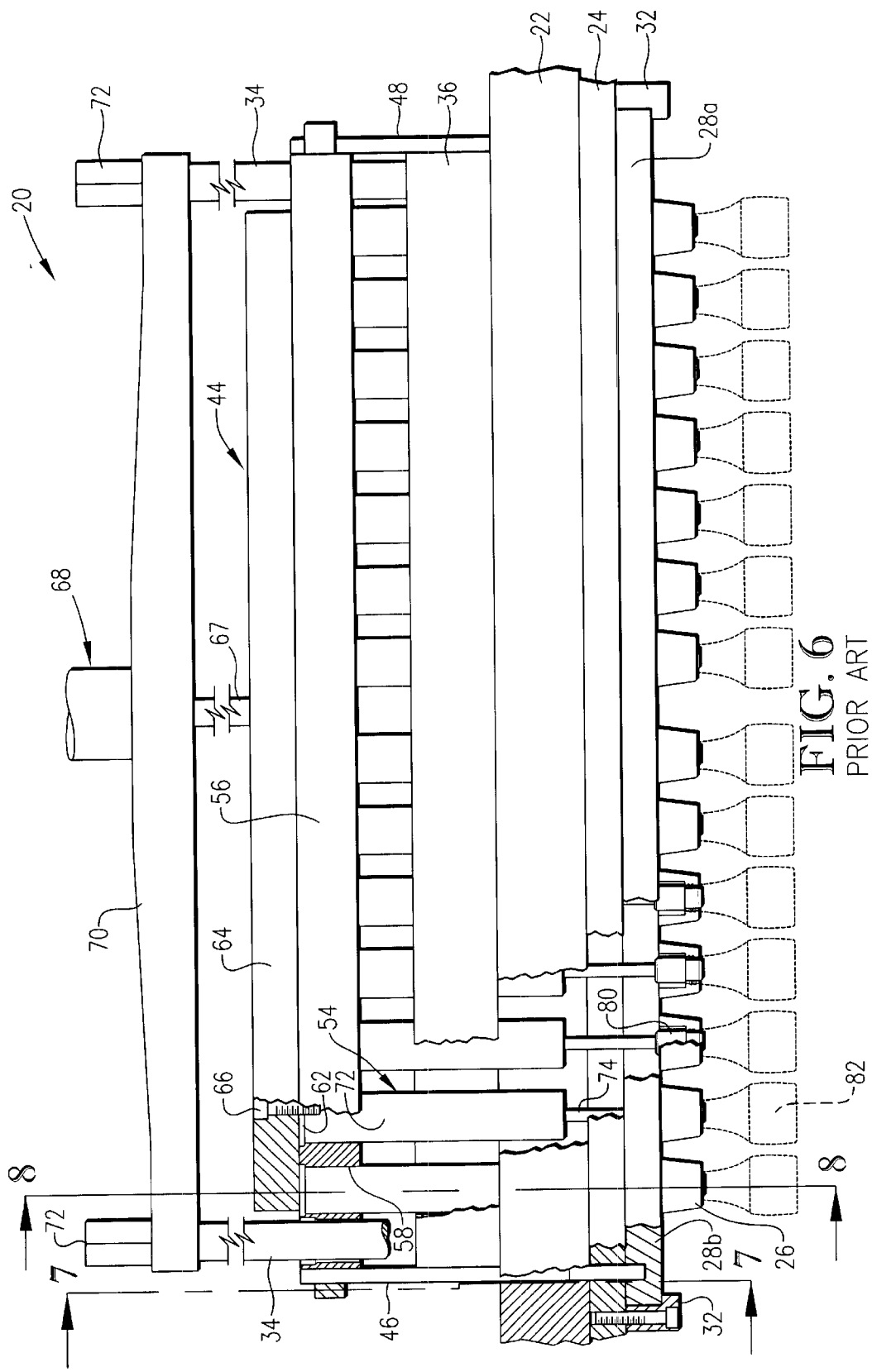
FIG. 6 is an elevational view of the prior art eject station with the prior art eject head partially lowered, parts being broken away and shown in cross-section for clarity.
Figure 10:
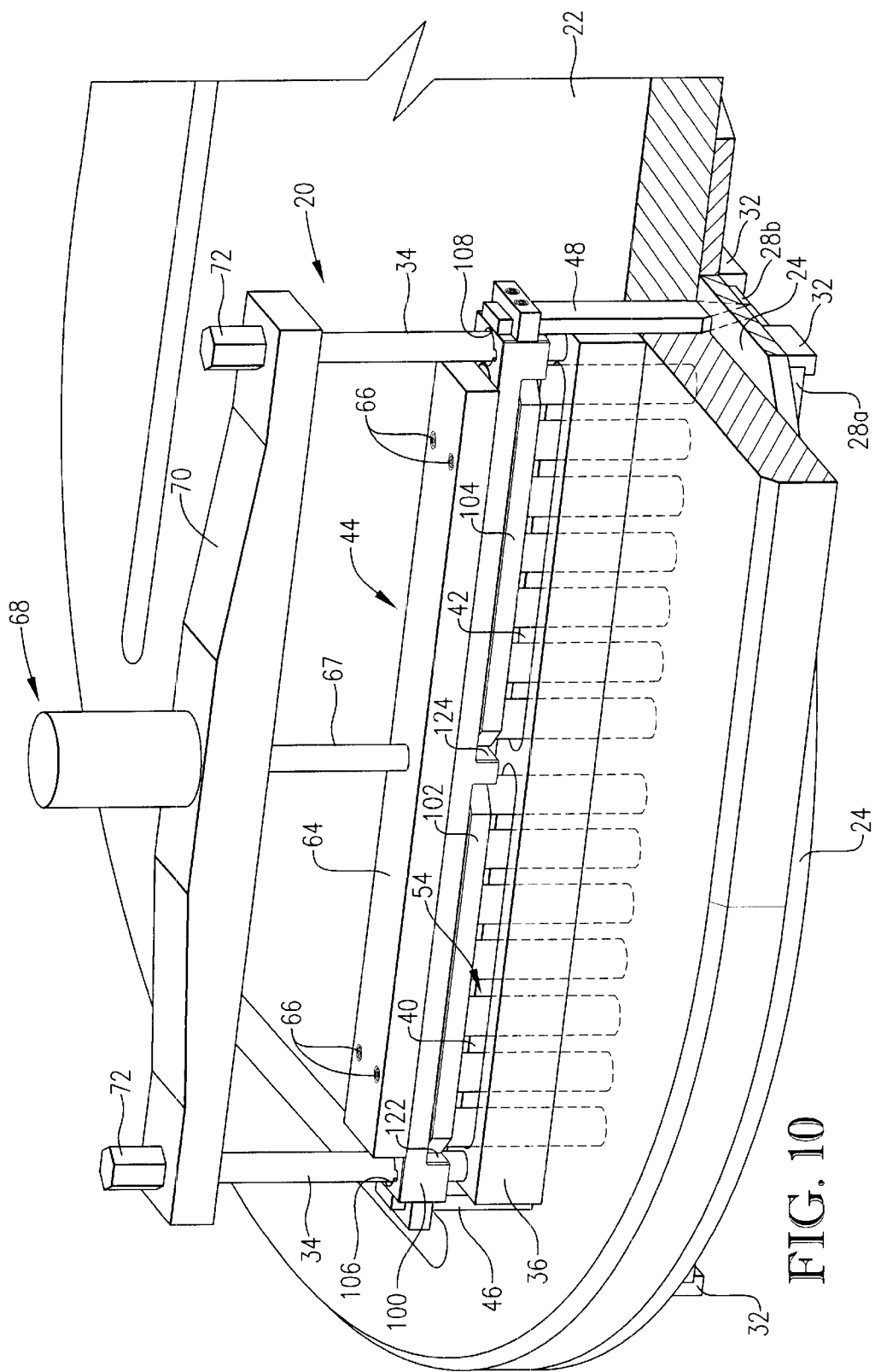
FIG. 10 is a perspective view of the eject ejection station of the machine utilizing quick change apparatus in accordance with the principles of the present invention.

Referring to FIGS. 4–8, the casting plate 22 overlies a rotation plate 24 which carries a row of thread splits 26 (FIGS. 6, 7 and 8). The thread splits 26 function to form threads in the neck of the preform during the injection cycle and also serve as a means of gripping the preforms and keep them attached to the rotation plate 24 for transport between the various stations of the machine. As well understood by those skilled in the art, the thread splits 26 each have two halves 26a and 26b as shown particularly in FIG. 8 that are attached to corresponding slide plates 28a and 28b that can be shifted toward and away from one another to effectively open and close the thread splits 26a, 26b. Slide plates 26a,26b are slidably supported beneath the rotation plate 24 by depending, generally L-shaped guides 32.

The eject station 20 includes a pair of upstanding guide rods 34 anchored to the casting plate 22. An elongated shim block 36 is positioned at the base of the guide rods 34 and overlies a long through slot 38 in the casting plate 22. Through slot 38 runs substantially the full length of the shim 36 and is disposed in vertical registration with a pair of end-to-end through slots 40 and 42 in the shim 36 and a long slot 43 in rotation plate 24.

A vertically reciprocable eject head 44 is slidably mounted on the guide rods 34 generally above the shim 36, and a pair of downwardly projecting cam bars 46 and 48 are secured to the eject head 44 at opposite ends thereof slightly outboard of the guide rods 34. Cam bars 46,48 pass through casting plate 22 and rotation plate 24 as shown in FIGS. 5 and 7, and the lower ends of cam bars 46,48 are tapered so as to match corresponding beveled surfaces 50 and 52 on the slide plates 28a and 28b. The tapered lower ends of the cam bars 46 and 48 interact with the beveled surfaces 50,52 to separate the thread splits 26a and 26b as illustrated in FIG. 8 when the eject head 44 is in its lowermost position.

Also associated with the eject head 44 are a number of generally cylindrical eject cores 54 that project down from the bottom of the head 44 and assist in assuring that products held by the thread splits 26 are fully released when thread splits 26a,26b are separated as in FIG. 8. The eject cores 54 correspond in number and position to the thread splits 26 and project through the through slots 40,42 in shim block 36, the through slot 38 in casting plate 22, and the through slot 43 in rotation plate 24. The eject cores 54 are arranged in a row and are carried by a mounting plate 56 of the eject head 44 for movement through the slots 40, 42,38, and 43 during reciprocation of head 44.

As illustrated best in FIGS. 5–8, the mounting plate 56 has a series of vertical holes 58 therethrough that receive and support the eject cores 54. As illustrated in the detail view of FIG. 8a, each hole 58 has an enlarged, recessed seat 60 at its upper end that matingly receives an enlarged flange 62 on the corresponding eject core 54. The depth of the recessed seat 60 is such that the upper end of each eject core 54 is substantially flush with the top surface of the mounting plate 56.

A cover plate 64 of the eject head 44 is somewhat shorter than the mounting plate 56 and lies between the guide rods 34 in covering relationship to the eject cores 54. Cover plate 64 is detachably secured to mounting plate 56 by threaded fasteners 66. Cover plate 64 is secured to the lower end of the actuating rod 67 of a pneumatic actuator 68 supported at the upper ends of the guide rods 34 by a crosshead 70. Crosshead 70 is held in place on the threaded upper ends of the guide rods 34 by a pair of large nuts 72.

As illustrated best in FIG. 8, each eject core 54 comprises an outer cylinder 72 and an inner, gravity-operated plunger 74. Plunger 74 is free to slide vertically within an internal, axial bore 76 but is retained against dropping completely out of bore 76 by an enlargement 78 at the upper end of plunger 74. At the lower end of plunger 74 a cylindrical plug 80 constructed from a suitable synthetic resinous material is positioned, it being the function of plug 80 to enter into the neck finish of the article such as the article 82 shown in FIG. 8, when the eject head 44 is lowered and just before the thread splits 26 are opened. Plug 80 thus has the effect of centering the article 82 and retaining the same against adherence to either of the thread split halves 26a,26b as they move apart, thereby assuring that the article 82 can gravitate freely from the eject station 20 upon separation of the thread splits 26.

Different production runs on the machine 10 as illustrated in FIGS. 1–9 may require different numbers of mold cavities which necessitates changing the number and positions of eject cores 54. Even if the number of mold cavities remains unchanged, the product being run may require that the set of eject cores for that particular run be changed out from a previous run because of changes in the neck finish. Thus, the present practice in the prior art is to have a number of different sets of eject cores and a number of different mounting plates 56 that can be changed out to prepare for the requirements of the particular run at hand. For example, although the eject station as illustrated in FIGS. 1–9 is set up for a fourteen cavity run such that fourteen eject cores 54 and a mounting plate having fourteen bores 58 are utilized, a particular run may call for six, eight, ten or twelve cavity setups instead. Thus, although the cover plate 64 can remain unchanged, the mounting plate 56 must be replaced to satisfy the requirements of the job at hand, along with, in most instances, the eject cores. However, in the prior arrangement, the mounting plate 56 cannot be removed and replaced without first disassembling the upper crosshead 70 from the guide rods 34, loosening the fasteners 66 that secure the cover plate 64 to mounting plate 56, and then lifting off the upper assembly consisting of the actuator 68 and the crosshead 70 along with the cover plate 64 and setting that structure aside. Then the mounting plate 56 can be slid up the guide rods 34 and off the machine, along with the eject cores 54.

In some situations, a new run can utilize the same mounting plate 56 as the preceding run, and it is only necessary to replace the eject cores. However, even in that situation, the upper assembly consisting of the actuator 68 and crosshead 70 as well as the cover plate 64 must be removed from the guide rods 34 and laid to one side for the reason illustrated in FIG. 5. FIG. 5 shows that although the cover plate 64 is coupled with the actuator 68 in such a way that plate 64 can be swivelled 90° into an access position relative to the mounting plate 56 once the threaded fasteners 66 have been loosened, the presence of cover plate 64 even in its access position interferes with withdrawal of one or more of the inboardmost eject cores 54. The length of cores 54 is such that, in the inboardmost positions, they simply cannot be completely withdrawn from the holes 58 without striking the bottom of the cover plate 64. Consequently, in order to remove all of the eject cores 54, it is necessary to completely remove the upper assembly even if mounting plate 56 is not to be exchanged.

Quick Change Apparatus

FIGS. 10–17 disclose quick change apparatus in accordance with the present invention at the eject station 20 using many of the same components as the prior art, but not all. For the sake of clarity and understanding, components which carry over from the prior art arrangement and shown in FIGS. 10–17 are denoted by the same number used hereinabove, while new components are designated by a new series of numbers.

In accordance with the invention, the mounting plate 56 of the prior art is no longer used. In its place, a universal mounting plate 100 and sets of paired adaptor plates 102 and 104 are utilized. As will be seen, the adaptor plates 102 and 104 are detachably secured to the universal mounting plate 100 so that different pairs of adaptor plates 102,104 can be attached to and removed from the mounting plate 100 to accommodate changes in the sizing and/or spacing of the eject cores 54 as may be necessary for different production runs. Although the preferred and illustrated embodiment shows the use of a pair of adaptor plates 102,104, it will be apparent to those skilled in the art that it is within the scope of the invention to use only a single, longer adaptor plate, or a multitude of shorter adaptor plates as may be appropriate or desirable. Further, it will be appreciated by those skilled in the art that the present invention is not limited to any particular model or brand of molding machine.

Whereas in the prior art arrangement the mounting plate 56 consists of an essentially single component that is changed out each time there are changes necessary in the eject cores 54, in the present invention the universal mounting plate 100 is never changed out and only sets of the adaptor plates 102,104 are exchanged. As will be appreciated, this results in very sizeable gains in productivity and worker safety.

Figure 15:
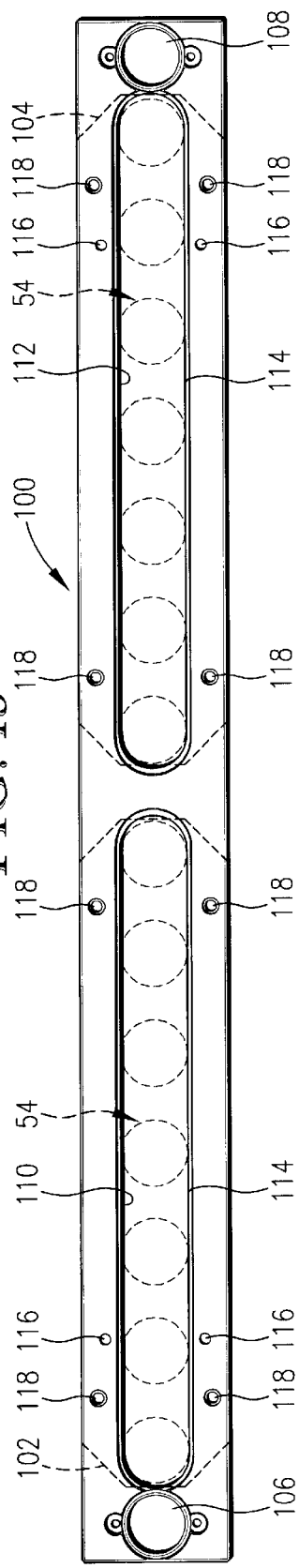
FIG. 15 is a top plan view of the universal mounting plate of the quick change apparatus.
Figure 17:
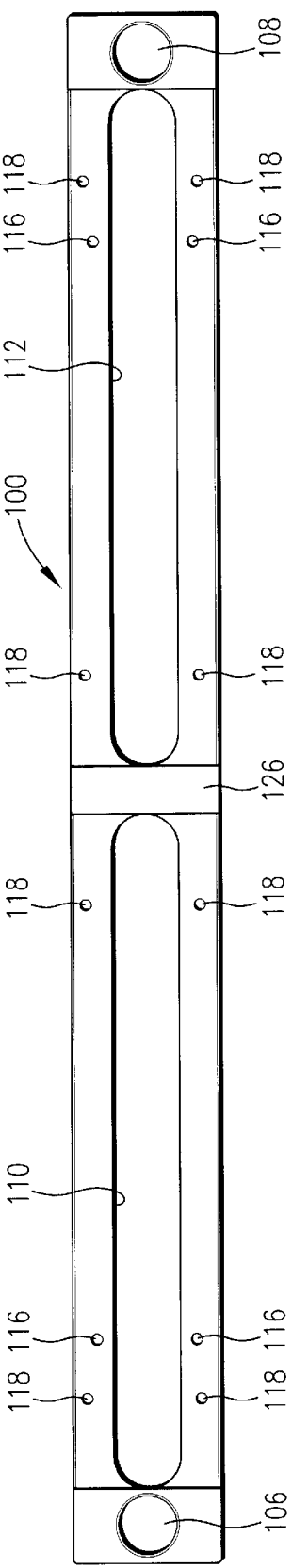
FIG. 17 is a bottom plan view of the universal member.

The universal mounting plate 100 and the adaptor plates 102, 104, along with their various fasteners as described below, effectively comprise quick change apparatus forming a part of the eject head 44. Dealing first with the universal mounting plate 100, it will be seen that plate 100 essentially comprises a long bar that is rectangular in plan as illustrated in FIGS. 15 and 17. Universal plate 100 is the same length as the prior art mounting plate 56 and has a pair of openings 106 and 108 at its opposite ends that slidably receive the guide rods 34. A pair of through slots 110 and 112 are formed in end-to-end alignment in the universal plate 100, each slot 110,112 having a peripheral, recessed seat 114 around its upper margin. Slots 114 are slightly wider than the outer diameter of the eject cores 54 but are narrower than the flange 62 of such cores, except across the seat 114, so that the cores 54 are kept from slipping completely through the slots 110 and 112 by the flanges 62, and yet flanges 62 are flush with the upper surface of universal plate 100. Four threaded holes 116 through the universal plate 100 adjacent its opposite ends receive the screws 66 associated with the cover plate 64 for the purpose of detachably securing cover plate 64 to the universal plate 100. In addition, eight countersunk holes 118 adjacent opposite ends of universal plate 100 and the mid-portion thereof receive corresponding screws 120 for detachably fastening the adaptor plates 102,104 to the universal plate 100. As a consequence, cover plate 64, universal plate 100, adaptor plates 102,104 and eject cores 54 all move as a unit, effectively forming the eject head 44, when the actuator 68 is actuated.

Figure 11:
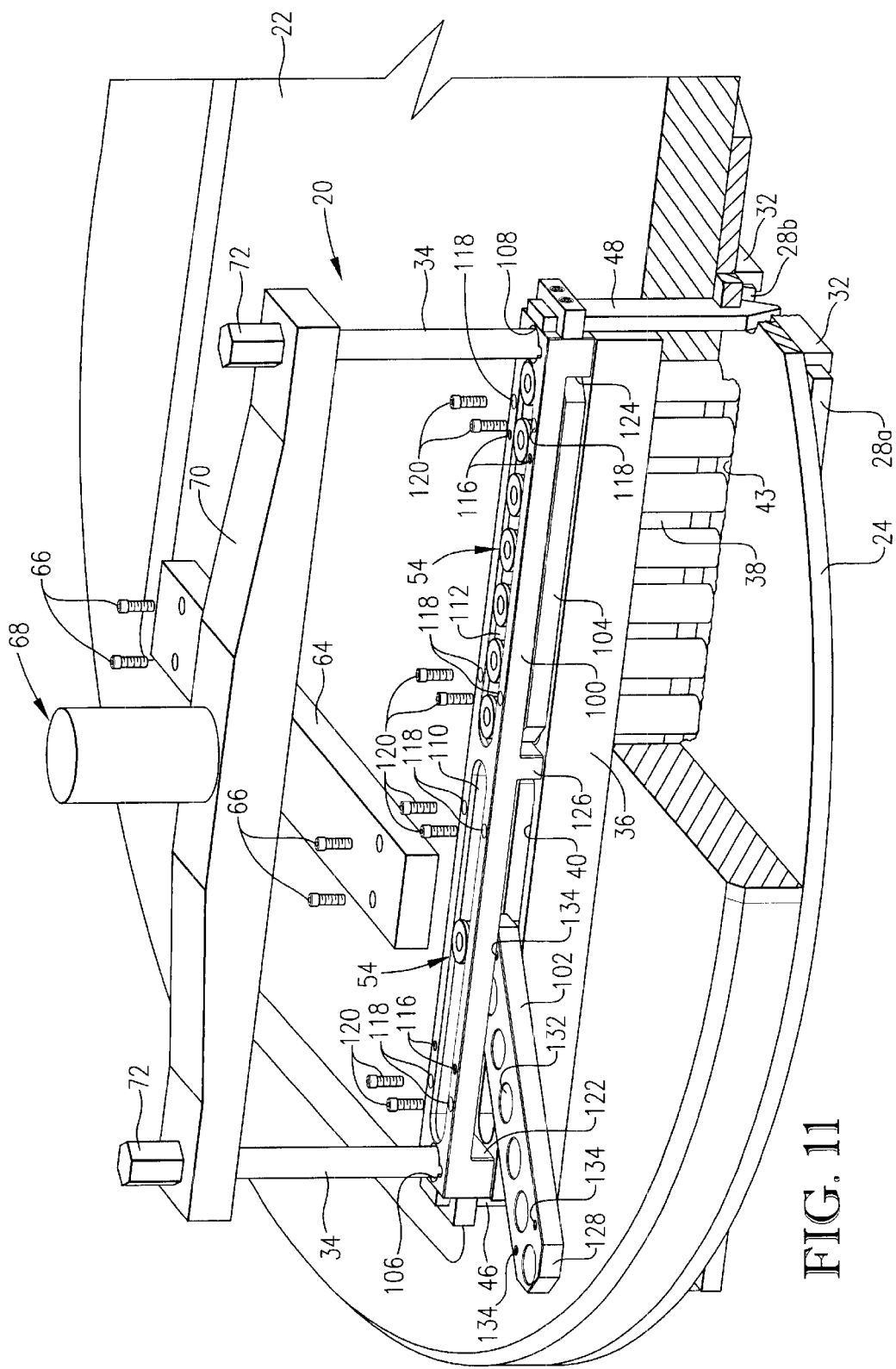
FIG. 11 is a perspective view of the eject station utilizing the quick change apparatus of the present invention and illustrating the manner in which the station can be quickly and easily changed over to accommodate a different set of eject cores.
Figure 12:
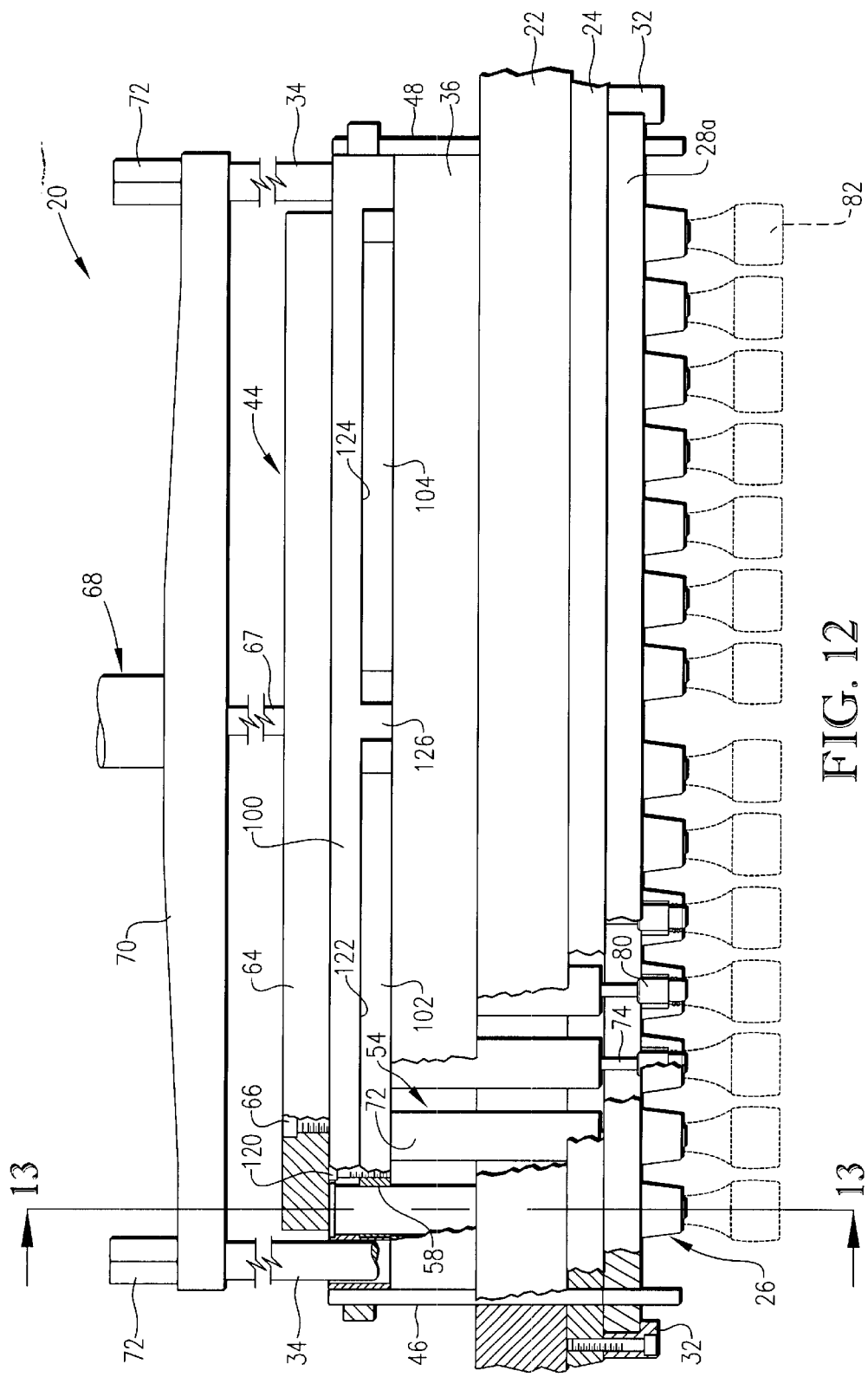
FIG. 12 is an elevational view of the eject station employing quick change apparatus in accordance with the principles of the present invention and showing the eject head fully lowered, parts being broken away and shown in cross-section for clarity.
Figure 16:
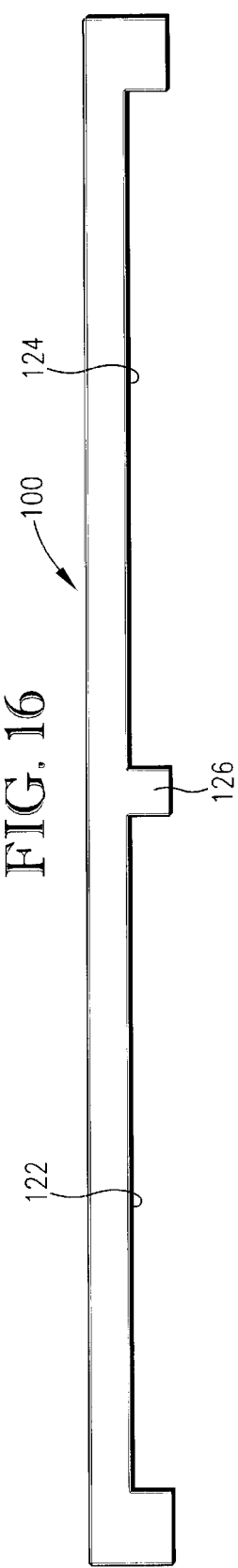
FIG. 16 is a side elevational view of the universal plate member.

As shown best in FIGS. 11 and 16, the universal plate 100 is notched out on its bottom side to present a pair of relatively long notches 122 and 124 configured to receive the corresponding adaptor plates 102 and 104. A central, transverse bulkhead 126 separates the two notches 122,124 and helps locate the adaptor plates 102,104 as they are inserted into the notches 122 and 124.

As shown particularly in FIG. 14 illustrating, by way of example, the adaptor plate 102, each of the adaptor plates is generally rectangular in overall plan, with a pair of opposite, tapered ends 128 and 130 presented by bevels at the corners. Instead of having beveled corners, ends 128 and 130 may each have a full radius so as to be completely rounded. Each adaptor plate has a row of through holes 132 along the central longitudinal axis thereof, the number and spacing of such holes depending upon the number and spacing of mold cavities for which the adaptor plate is designed. Each adaptor plate is devoid of guide openings at its opposite ends for the guide rods 34 since the adaptor plates are not intended to be in anyway secured to the guide rods 34. Each adaptor plate also has a set of four threaded holes 134, two at each end for threadably receiving the fasteners 120 that pass through universal plate 100. When adaptor plates 102 and 104 are secured in place within the notches 122,124 of universal plate 100, holes 132 are in underlying registration with the overhead slot 110 or 112 of universal plate 100 and in overlying registration with the through slots 40,42 in shim 36. Consequently, although the eject cores 54 are theoretically moveable longitudinally within the slots 110,112 of universal plate 100, the adaptor plates 102,104 establish the number of eject cores that can be received within the slots 110,112 and their locations when the adaptor plates 102,104 are secured in place by the screws 120.

It is contemplated that only a single universal plate 100 will be needed to accommodate all variations of mold cavity numbers and positions. On the other hand, several different pairs of adaptor plates 102,104 will be utilized. Regardless of which particular pair of adaptor plates 102,104 is utilized, changing over the eject station 20 for a new cavitation arrangement is always carried out in the same quick and easy procedure.

During operation, it will be appreciated that the eject head 44 is reciprocated vertically by actuator 68 in the usual manner. To change out the eject cores 54 for a new production run, the operator first lowers the head 44 to its lowermost position to facilitate access to the screws 66 that secure cover plate 64 to universal plate 100. Upon loosening and removing screws 66, cover plate 64 may be raised by actuator 68 and rotated 90° to the position of FIG. 11 which exposes the eject cores 54. All but the two inboardmost eject cores 54 of the two slots 110,112 can then be simply pulled up out of the universal plate 100 and laid to one side without interference from the cover plate 64. By then removing the screws 120, adaptor plates 102 and 104 are freed to be swung or pivoted outwardly about the remaining ejector core 54 as illustrated with respect to the adaptor plate 102 in FIG. 11. Once the end 128 is out of notch 122 in universal plate 100, the opposite end of the adaptor plate 102 can be shifted along slot 110 until the remaining adaptor core 54 is out from underneath the cover plate 64, whereupon the remaining eject core 54 can simply be pulled up and out of universal plate 100 and adaptor plate 102. This completely releases the adaptor plate 102 from universal plate 100.

When all of the eject cores 54 have been removed and both adaptor plates 102 and 104 have been taken out of their receiving notches 122,124, a new pair of adaptor plates 102,104 may be installed in accordance with the new cavity specifications. By inserting one end of the new adaptor plate 102 or 104 into its notch in universal plate 100 until such time as the inboard hole 132 aligns with the slot 110 or 112 in universal plate 100, a new eject core 54 may be inserted down through the appropriate slot and hole 132 so as to effectively form a pivot for the adaptor plate. Thereafter, by sliding the inserted eject core 54 to the appropriate end of the slot 110 or 112, the adaptor plate may then be fully swung into the corresponding notch until the new row of holes 132 comes into registration with slot 110 or 112 in universal plate 100. Thereupon the remaining eject cores can be inserted and the screws 120 threaded into place. Once both adaptor plates 102 and 104 have been fully secured to the universal plate 100 in this manner, cover plate 64 may be swivelled back into overhead covering relationship with universal plate 100 and lowered by actuator 68 down into engagement therewith. Replacing screws 66 then resecures cover plate 64 to universal plate 100, whereupon eject head 44 is once again ready to resume operation.

It will be appreciated that with the quick change apparatus of the present invention, the upper crosshead assembly of eject station 20 never needs to be disassembled and set aside from the rest of the station. Instead, changing over the eject station from one cavitation arrangement to another is quickly and easily carried out, with a minimum of physical exertion, by loosening a few screws and interchanging a few parts. Worker safety is maximized, while downtime is minimized.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor(s) hereby states their intent to rely on the doctrine of equivalents to determine and assess the reasonably fair scope of the present invention as pertains to any apparatus not materially departing from but outside the literal scope of the invention as set forth in the following claims.

What is claimed is:

1. In a molding machine having an eject station at which molded articles are released from a rotation plate of the machine, the improvement comprising:

a vertically reciprocable eject head having a plurality of eject cores projecting downwardly therefrom for use in releasing the articles during an ejection stroke of the head, each of said eject cores having an enlarged circumferential flange at an upper end thereof and a main body having a reduced diameter relative to said flange; and an actuator operably coupled with said head for reciprocating the head through ejection and retraction strokes, said head including a universal mounting plate having an elongated through slot that is wider than the diameter of the body of each eject core but narrower than the diameter of the flange such that the body of a eject core may project through the slot but the eject core is retained by the flange engaging the universal mounting plate, said universal mounting plate being long enough to permit a number of said eject cores to be received within the slot, an elongated adaptor plate having a longitudinally extending row of holes therethrough at predetermined spaced locations along the length of the plate, each of said holes being larger than the diameter of the body of the eject cores, said adaptor plate underlying said universal mounting plate with said row of holes in registration with said slot whereby the holes establish the number and spacing of eject cores that can be received within the universal mounting plate, and a cover overlying said universal mounting plate and the eject cores for retaining the eject cores within the slot, said cover and said adaptor plate being detachably secured to said universal mounting plate to permit selective removal and replacement of the eject cores and adaptor plate.

2. In a molding machine as claimed in claim 1, said slot in the universal mounting plate having a recessed seat for the flanges of the eject cores.

3. In a molding machine as claimed in claim 1, said universal mounting plate having an elongated notch in the bottom thereof, said adaptor plate being received within said notch.

4. In a molding machine as claimed in claim 1, said universal mounting plate having a pair of said slots disposed in end-to-end alignment with one another, there being an adaptor plate for each of said slots.

5. In a molding machine as claimed in claim 4, said universal mounting plate having a pair of elongated notches in the bottom thereof adapted to receive respective ones of said adaptor plates.

6. In a molding machine as claimed in claim 1, said cover and said adaptor plate being secured to said universal mounting plate using threaded fasteners.

7. In a molding machine as claimed in claim 1, said cover being rotatable relative to the universal mounting plate to an access position out of overlying relationship with at least a plurality of the eject cores in the slot when the cover is detached from the universal mounting plate.

8. Quick change apparatus for a reciprocable eject head at the eject station of an article molding machine wherein articles are ejected from a rotation plate of the machine during each eject cycle using structure that includes a row of side-by-side eject cores associated with the head, each eject core having a main body and an enlarged flange at the upper end of the body, said apparatus comprising:

an elongated universal mounting plate having a pair of mounting openings at opposite ends thereof for receiving corresponding guide rods of the eject station when the universal mounting plate is installed on the rods, said universal mounting plate having at least one through slot therein extending longitudinally of the universal mounting plate, said slot being wider than the diameter of the body of each eject core but narrower than the flange; and at least a pair of interchangeable adaptor plates each having a row of holes therethrough, one plate of the pair having a different number of holes than the other plate, said plates being interchangeably selectively securable to the universal mounting plate with the row of holes in registration with the slot whereby to establish the number and position of eject cores receivable within the slot, depending upon which of the adaptor plates is secured to the universal mounting plate.

9. Quick change apparatus as claimed in claim 8, said slot in the universal mounting plate having a recessed seat for the flanges of the eject cores.

10. Quick change apparatus as claimed in claim 8, said universal mounting plate having an elongated notch in the bottom thereof, said adaptor plate being received within said notch.

11. Quick change apparatus as claimed in claim 10, said universal mounting plate having a pair of said slots disposed in end-to-end alignment with one another, there being an adaptor plate for each of said slots.

12. Quick change apparatus as claimed in claim 8, said adaptor plate being securable to said universal mounting plate using screws.

13. An adaptor plate for use as part of quick change apparatus for the reciprocable eject head of the eject station of an article molding machine, said adaptor plate having a row of side-by-side holes therein sized and located to receive and establish the position of corresponding eject cores associated with the head when the plate is installed on the machine as part of the quick change apparatus, said adaptor plate having a pair of opposite ends that are devoid of guide openings for guide rods associated with the eject station and further having apertures for receiving fasteners that releasably secure the plate to a slotted universal mounting plate of the quick change apparatus.

14. An adaptor plate as claimed in claim 13, said plate having a generally rectangular overall configuration when viewed in plan, said opposite ends of the plate having beveled corners whereby to render each of said opposite ends generally tapered.

15. An adaptor plate as claimed in claim 13, said plate having a generally rectangular overall configuration when viewed in plan, said opposite ends of the plate being rounded.

* * * * *